United States Patent [19]

Carlton

[11] 4,297,572
[45] Oct. 27, 1981

[54] TRACKING SOLAR ENERGY COLLECTOR ASSEMBLY

[75] Inventor: Richard J. Carlton, Sunnyvale, Calif.

[73] Assignee: Acurex Corporation, Mountain View, Calif.

[21] Appl. No.: 66,402

[22] Filed: Aug. 14, 1979

[51] Int. Cl.³ .................................................. G01J 1/20
[52] U.S. Cl. .................................. 250/203 R; 126/425
[58] Field of Search .............................. 126/425, 424; 250/203 R, 211 R; 356/141, 152, 222, 220, 215

[56] References Cited

U.S. PATENT DOCUMENTS

| | | | |
|---|---|---|---|
| 3,875,404 | 4/1975 | Fletcher et al. | 250/211 R |
| 4,211,922 | 7/1980 | Vaerewyck et al. | 126/425 |
| 4,223,214 | 9/1980 | Dorian et al. | 250/203 R |

*Primary Examiner*—David C. Nelms
*Attorney, Agent, or Firm*—Flehr, Hohbach, Test et al.

[57] ABSTRACT

A solar energy collector assembly of the tracking type is disclosed herein and includes a solar panel mounted for movement along a predetermined tracking path in order to maintain a predetermined orientation with respect to the sun as the latter moves across the sky. The disclosed assembly also includes a specific solar tracking sensor for maintaining the panel member in its predetermined orientation and a Direct Insolation Monitor (D.I.M.) provided to monitor the presence and absence of direct sunlight in order to prevent the sensor from mistaking a relatively bright cloud or other diffused light for the sun.

22 Claims, 21 Drawing Figures

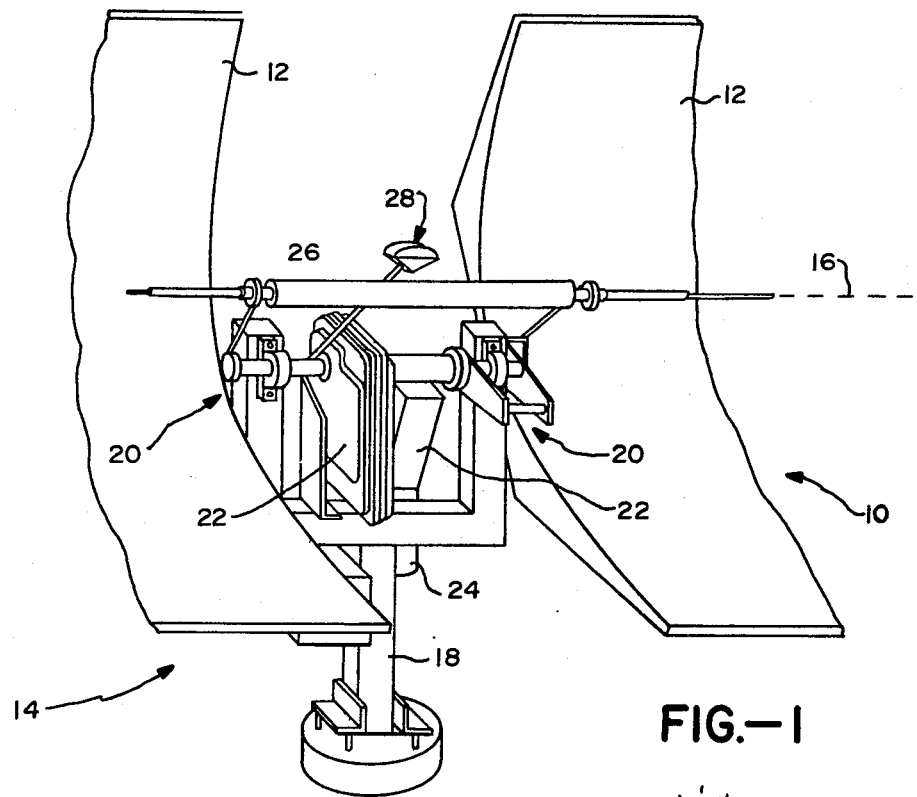
FIG.—1
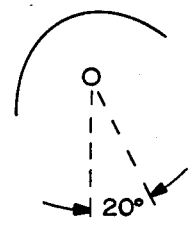
FIG.—2A
FIG.—2B
FIG.—2C
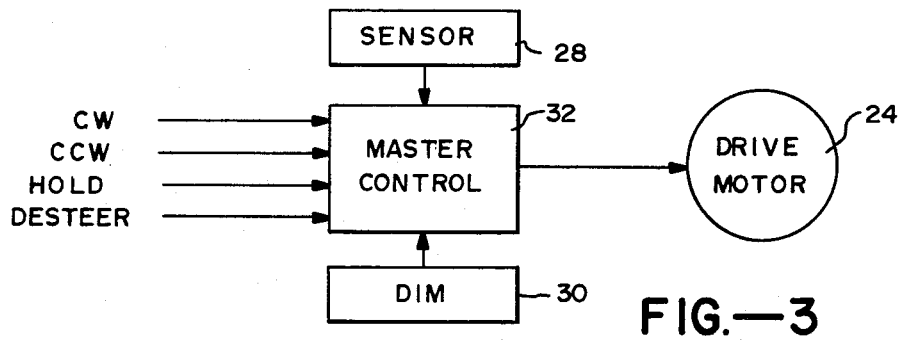
FIG.—3

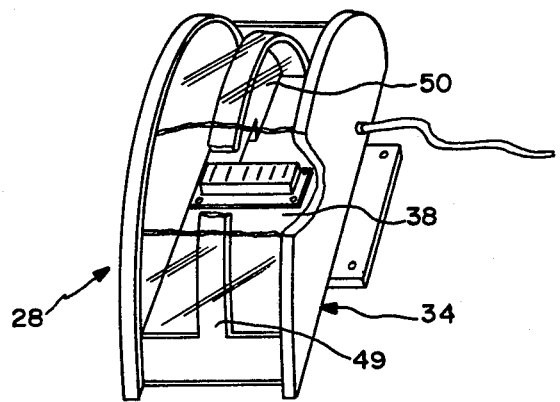
FIG.—4
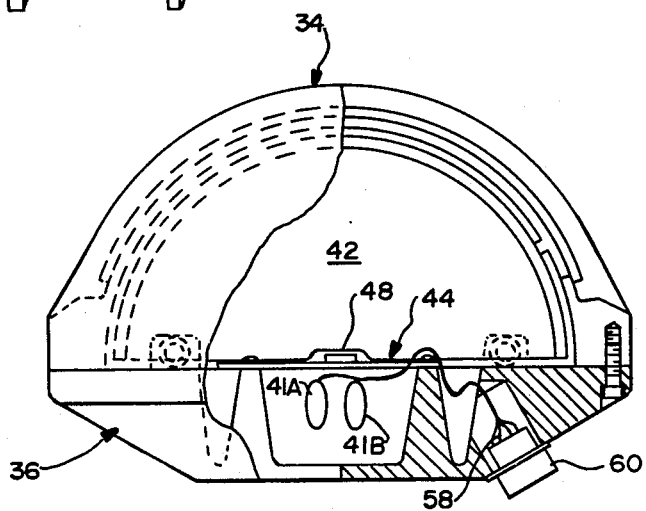
FIG.—5
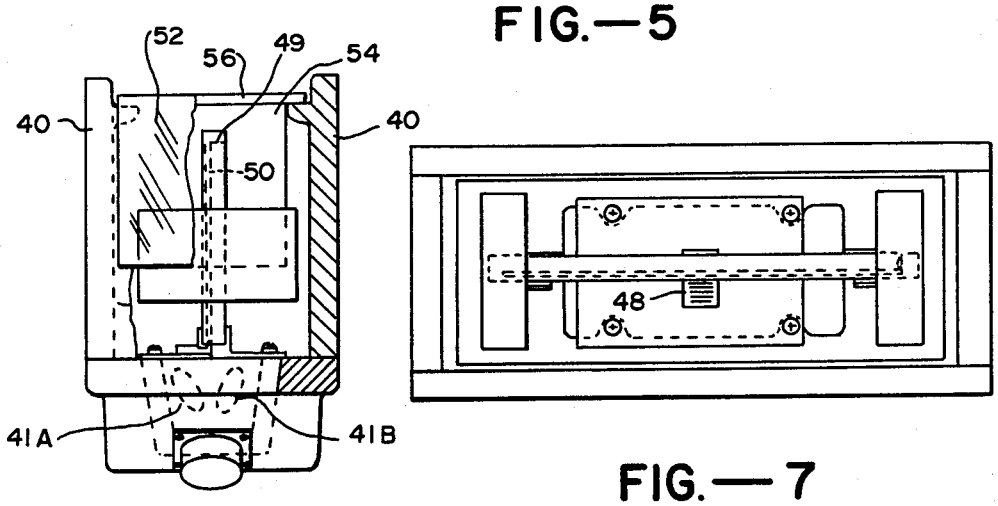
FIG.—6
FIG.—7

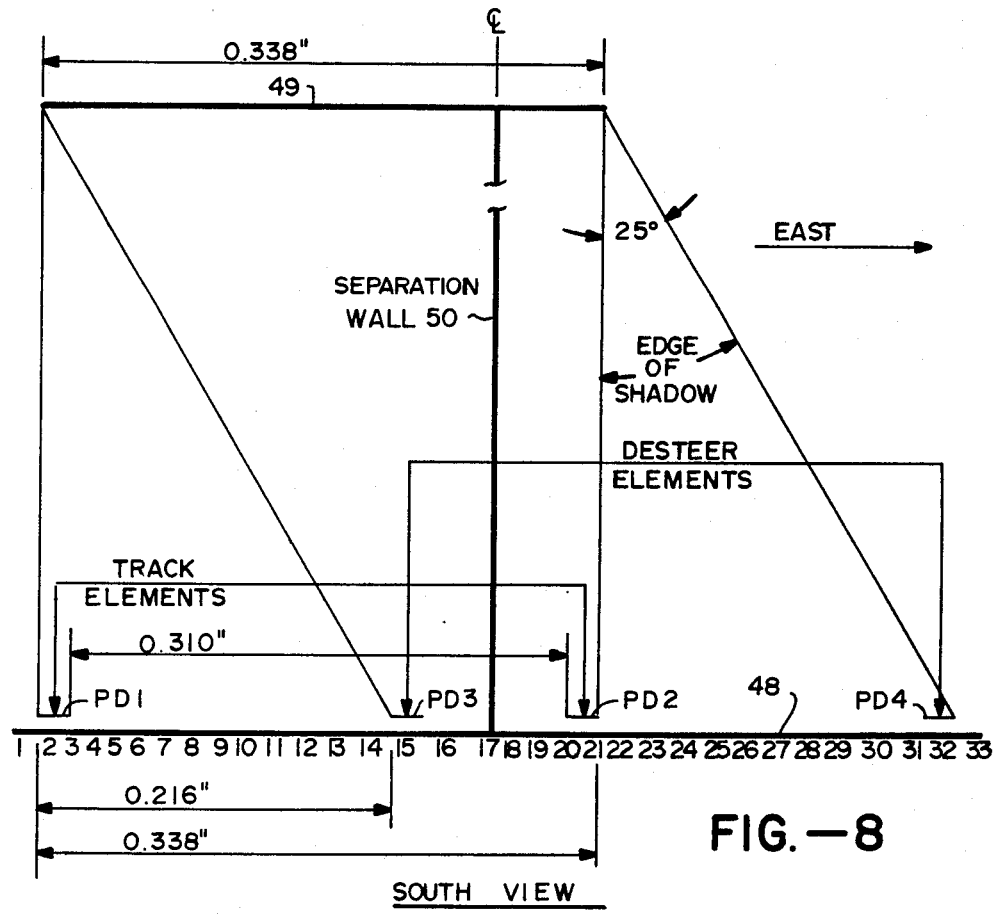
FIG.—8
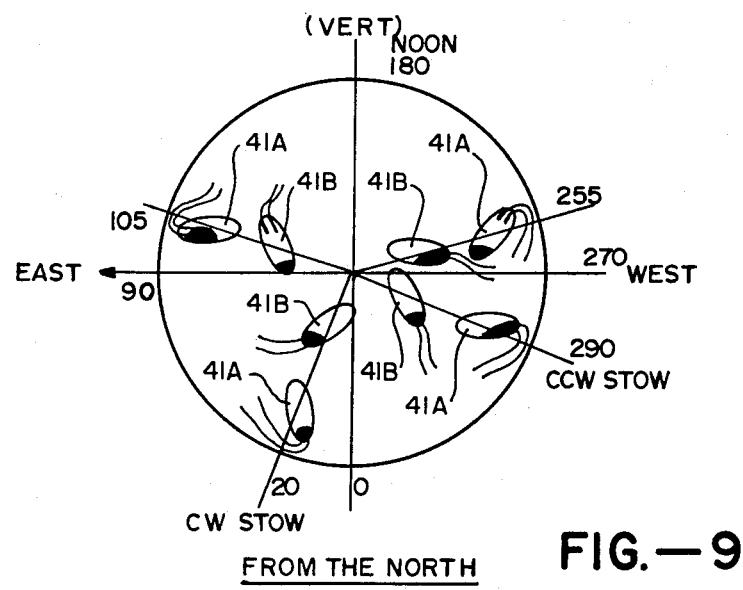
FIG.—9

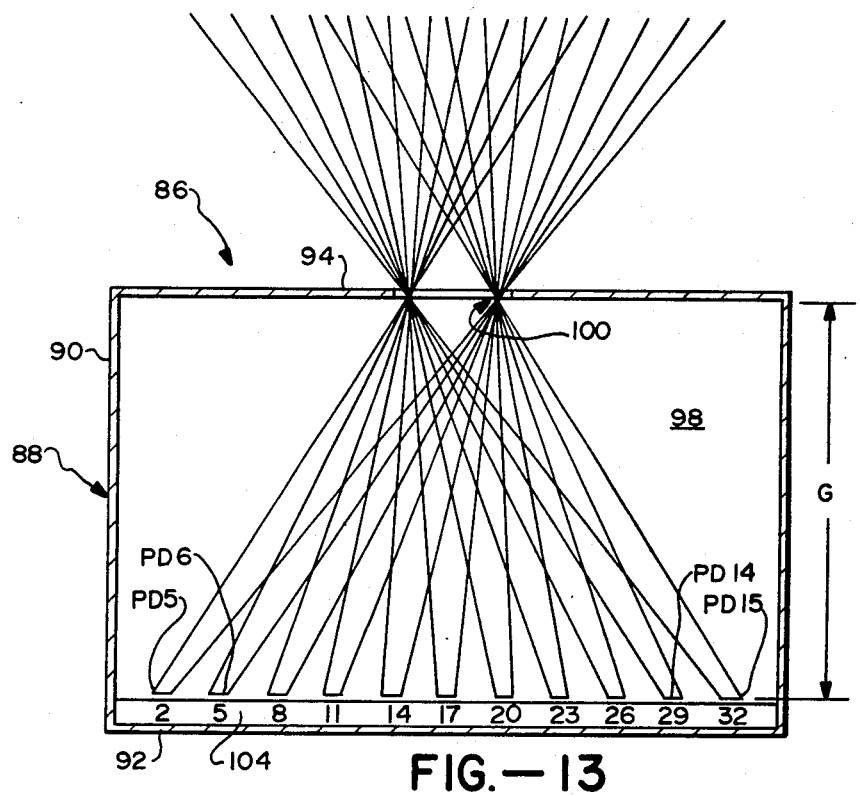
FIG.—13
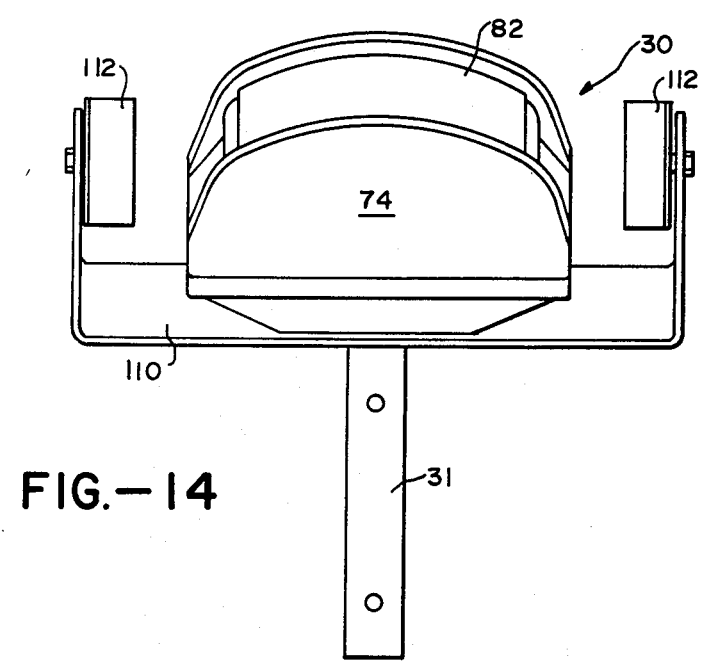
FIG.—14

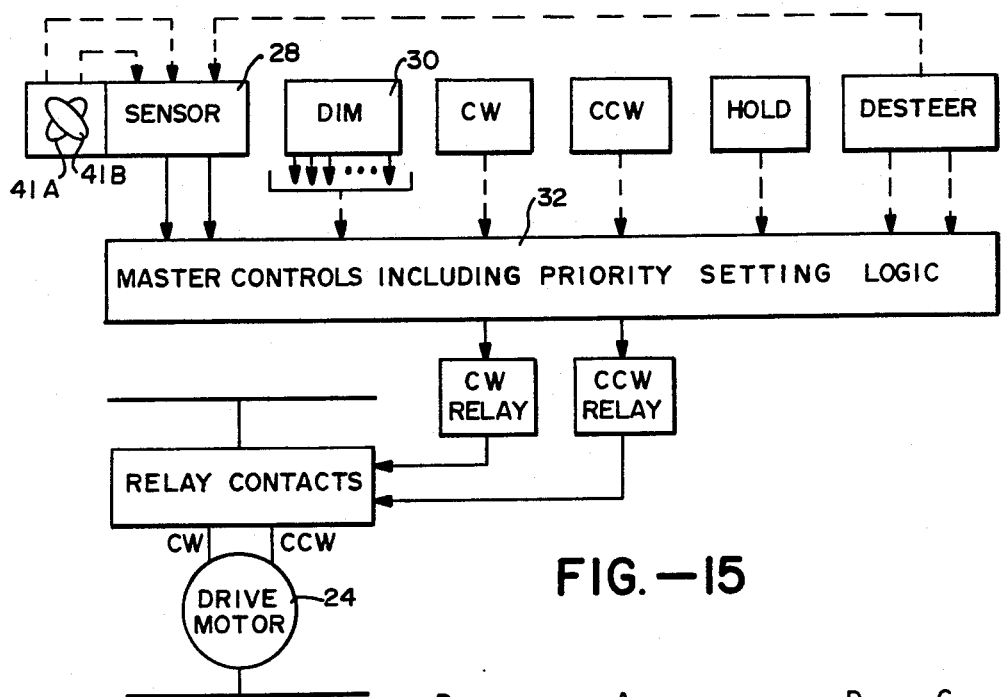
FIG.—15
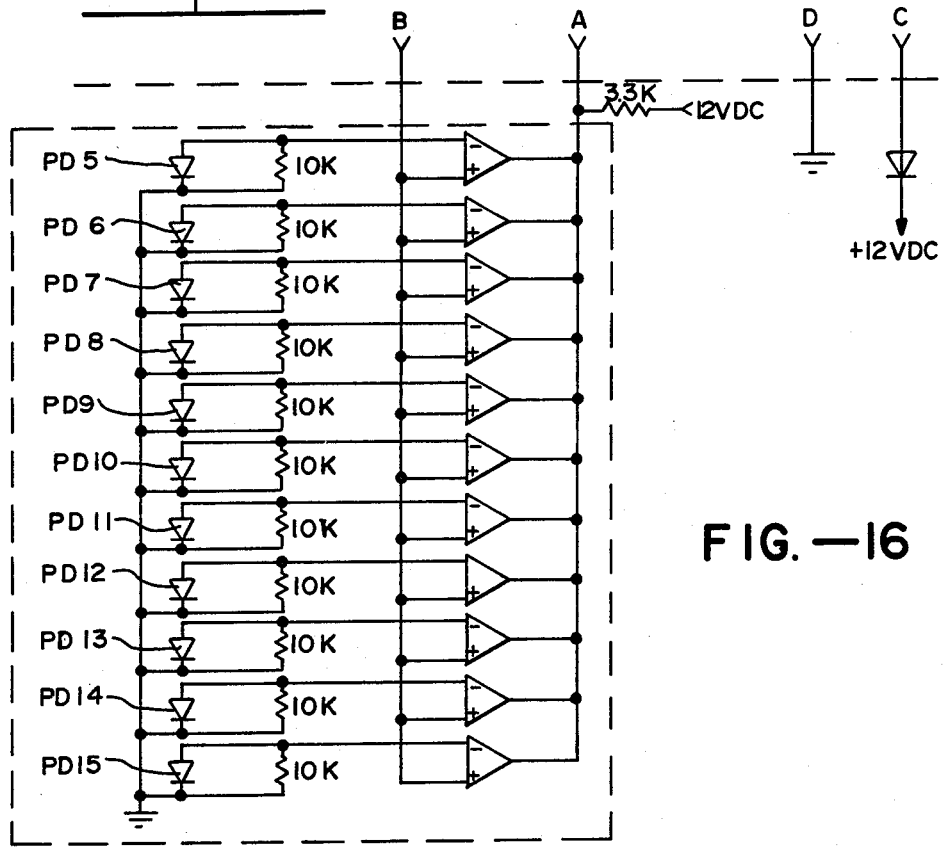
FIG.—16

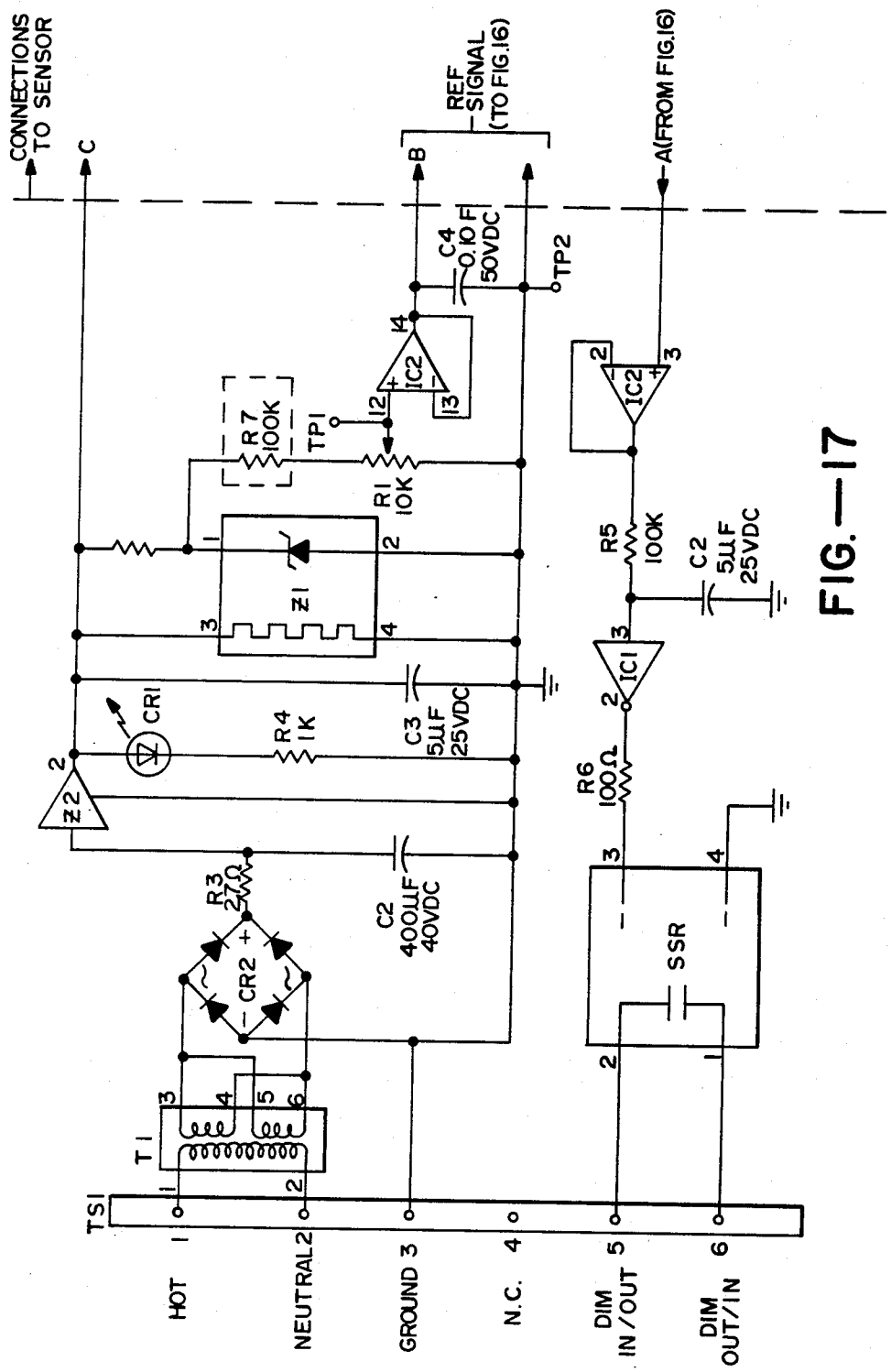
FIG.—17

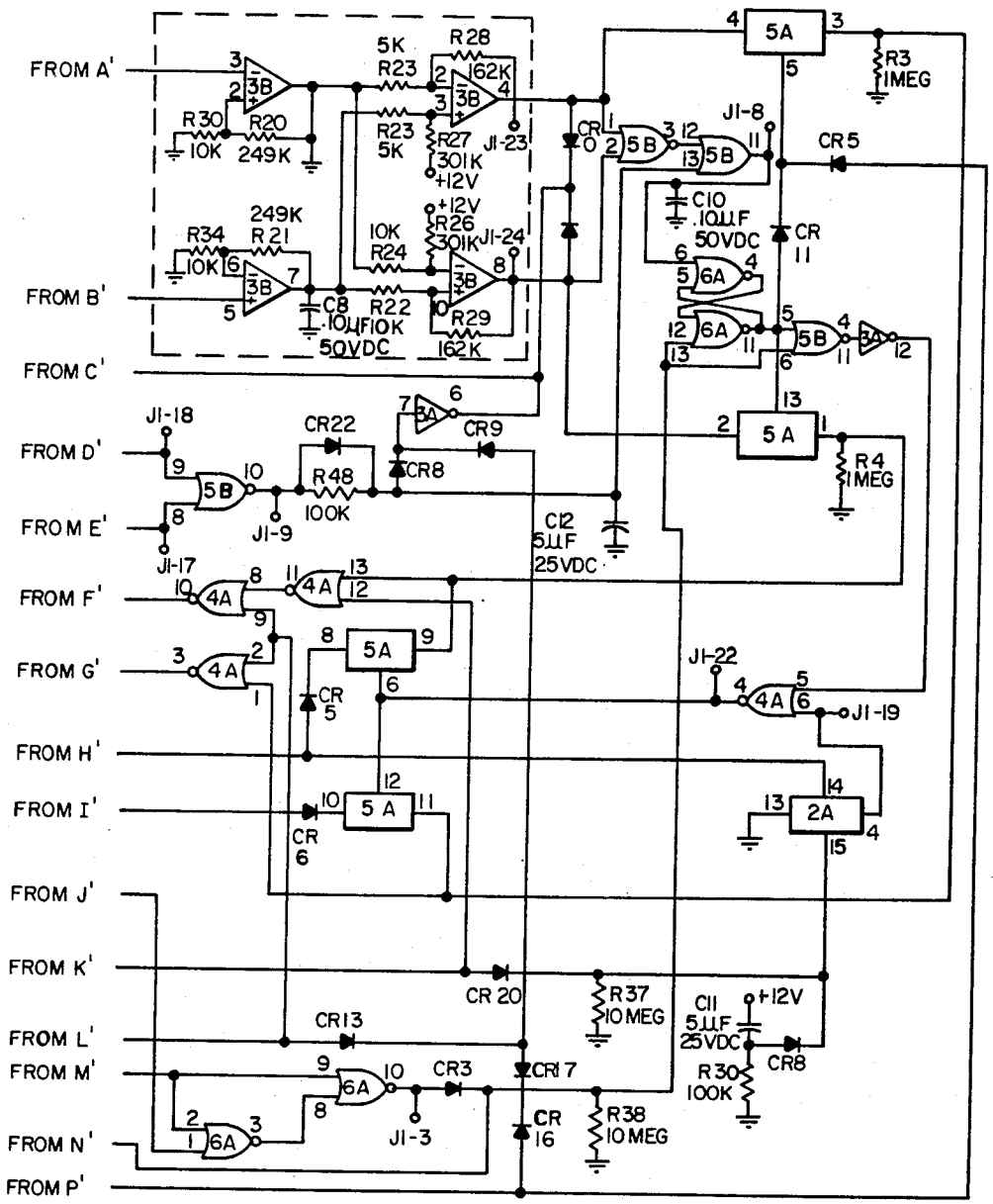
FIG.—18B

TRACKING SOLAR ENERGY COLLECTOR ASSEMBLY

The present invention relates generally to solar energy collector assemblies and more particularly to an assembly of the solar tracking type including a specific solar tracking sensor, a non-tracking device for monitoring the presence or absence of direct sunlight and other specific features to be discussed hereinafter.

There are a number of ways to collect solar energy, one of which is to track the sun as the latter moves across the sky from sunrise to sunset. This technique obviously results in a greater recovery of solar energy during a given day than the stationary approach, that is, where the solar panel remains in a fixed position. However, it should also be obvious that the former technique requires means for tracking the position of the sun. While tracking should be done in an uncomplicated, economical and yet reliable way, this has not been the case in the past. For example, solar tracking sensors utilized heretofore were generally of the shadow producing type, e.g. shadow band sensors, and typically included a relatively wide field of view. It has been found that this allowed accumulated stray light to alter the shadow being measured and adversely affect its operation. These shadow band sensors use a pair of presumably identical photosensing elements in monitoring the shadow in order to provide balanced electrical outputs when the shadow is symmetric about its band. However, the photosensitive elements themselves have not always produced identical outputs, even in response to identical light intensity inputs, and hence did not accurately reflect the precise status of the shadow with respect to the band.

Another particular problem associated with the tracking type of solar energy collector assembly results from circumstances where there is not sufficient insolation, e.g., direct sunlight available to make tracking possible, for example when the sun is behind a cloud or on a generally hazy day. In the past, one way of meeting this problem was to use a pyronometer to detect direct sunlight. However, this approach has been found to be unacceptable since the pyronometer measures total incident insolation, that is, accumulated sunlight in the ambient surroundings and is not limited to direct insolation. Since accumulated diffuse sunlight on a relatively bright but cloudy day tends to be more intense than direct trackable insolation on a hazy day, the utilization of a pyronometer is fundamentally unsound.

In view of the foregoing, one object of the present invention is to provide a solar energy collector assembly of the tracking type which utilizes a solar tracking sensor having a limited field of view so as to minimize responding to accumulated rays of light from the ambient surroundings and thereby minimize mistaking bright clouds and/or other diffuse light for the sun.

Another object of the present invention is to provide a solar tracking sensor of the shadow band type which is designed to insure the utilization of identical light sensing elements thereby increasing accuracy of operation.

Still another object of the present invention is to provide for use in the solar collecting assembly a stationary, non-tracking type of device for monitoring the presence or absence of direct sunlight, e.g. a Direct Insolation Monitor (D.I.M.).

Yet another object of the present invention is to provide a non-tracking D.I.M. which is uncomplicated in design and yet one which reliably indicates the presence or absence of direct insolation regardless of the position of the sun as the latter moves across the sky.

As will be described in more detail hereinafter, the solar energy collector assembly disclosed herein is one which utilizes means including a panel member for collecting solar energy. The panel member is mounted for movement along a predetermined tracking path in order to maintain a predetermined orientation with respect to the sun as the latter moves across the sky from an initial position immediately following sunrise to a final position immediately preceding sunset. The overall assembly includes an electric motor or other suitable means for moving the panel member back and forth along its tracking path.

In accordance with one aspect of the present invention, the assembly disclosed herein includes solar position sensing means, e.g., a sensor, mounted for movement with the panel member and responsive to the position of the sun for producing an output indicating whether or not the panel member is in its predetermined orientation. In accordance with another aspect of the present invention, the overall assembly includes stationary means, e.g., a D.I.M., which includes a plurality of fixed light sensing elements and which is positioned to receive a limited beam of direct sunlight on at least one of the light sensing elements regardless of the position of the sun as the latter moves from an initial tracking position in the sky to a final tracking position. This stationary means produces a plurality of outputs respectively corresponding to light intensity received at its light sensing elements. These outputs and the output from the solar sensing means are used by control means comprising part of the assembly and connected with the previously recited electric motor or other such moving means for controlling the operation of the moving means to continuously place the panel member in its predetermined orientation with respect to the sun as the latter moves across the sky from its initial position to its final position, so long as the intensity of light received on at least one of the light sensing elements is at or above a threshold level indicative of the presence of direct sunlight.

The foregoing aspect of the present invention and other aspects will be discussed in more detail hereinafter in conjunction with the drawings wherein:

FIG. 1 is a perspective view of an overall solar energy collector assembly of the tracking type designed in accordance with the present invention;

FIGS. 2A, 2B and 2C diagrammatically illustrate how the assembly of FIG. 1 tracks the sun from its initial position in the east to its final position in the west;

FIG. 3 is a block diagram illustrating generally the operation of the assembly of the FIG. 1;

FIG. 4 is a perspective view of a solar tracking sensor designed in accordance with the present invention and comprising part of the assembly of FIG. 1;

FIG. 5 is a partially broken away, side elevation view of the sensor of FIG. 4;

FIG. 6 is a partially broken away end view of the sensor of FIG. 4;

FIG. 7 is a top plan view of the sensor of FIG. 4;

FIG. 8 is a diagrammatic illustration of the way in which the sensor of FIG. 4 operates to track the position of the sun;

Figure 10:
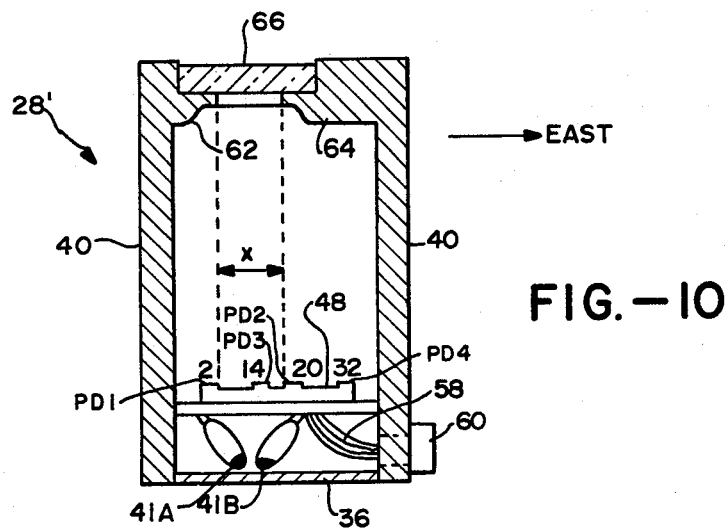
Figure 11:
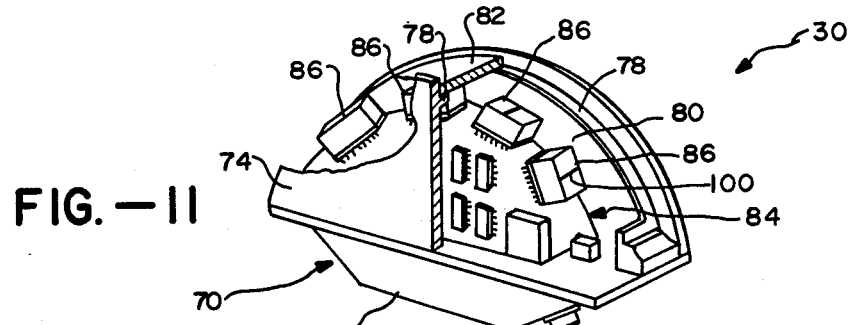
Figure 12:
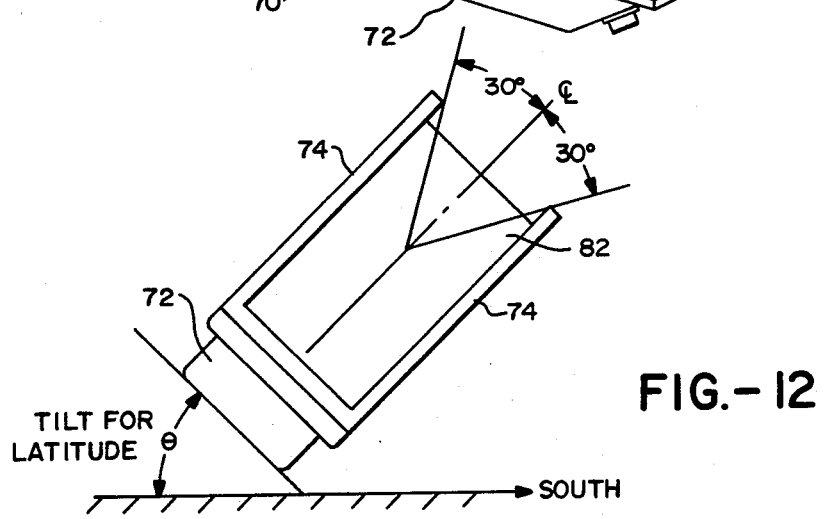
Figure 18A:
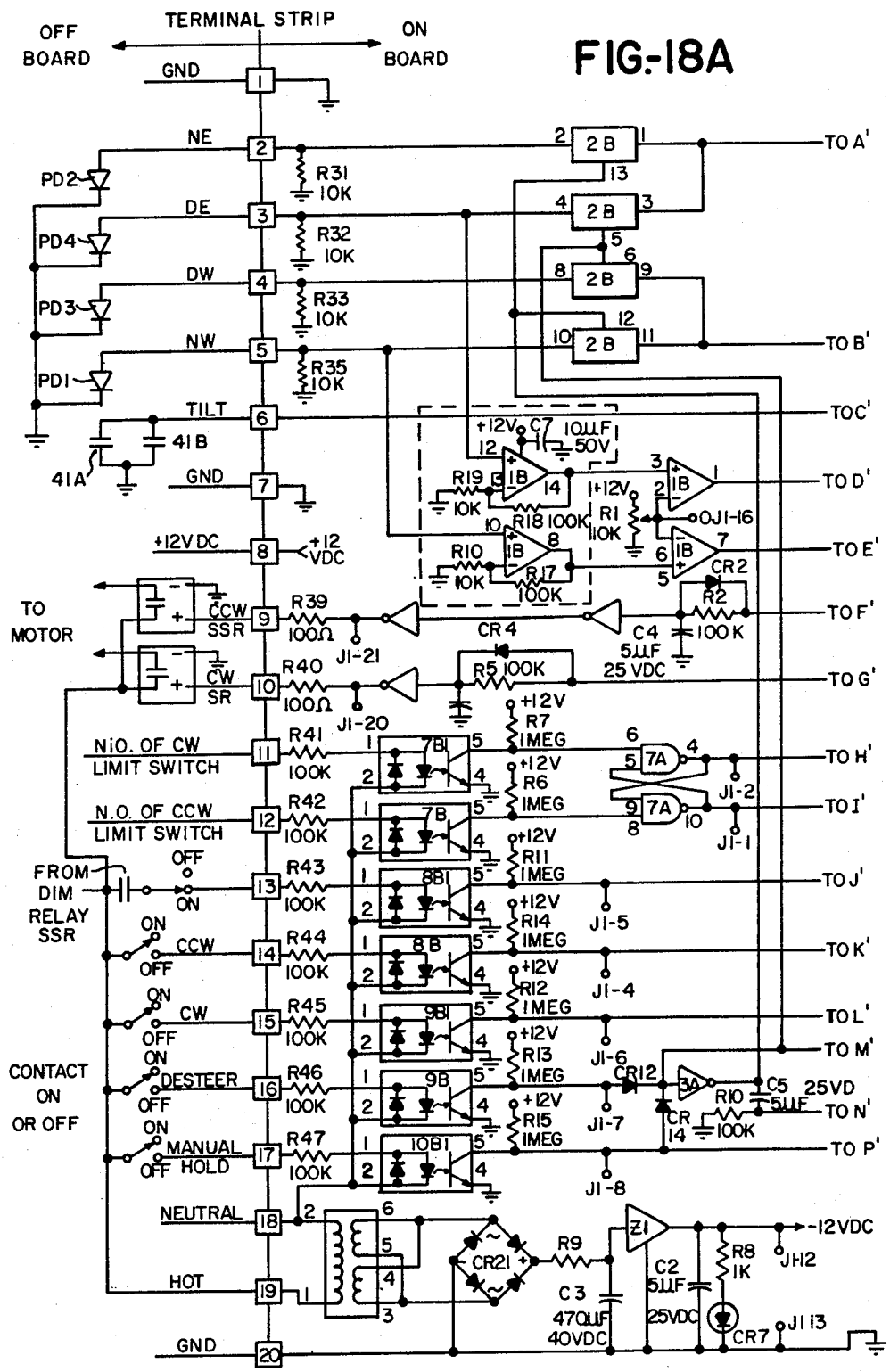

FIG. 9 diagrammatically illustrates the operation of a particular switch arrangement comprising part of the sensor of FIG. 4;

FIG. 10 is a vertical sectional end view of a modified solar tracking sensor but one which functions in the same manner as the assembly of FIGS. 4 through 9;

FIG. 11 is a partially broken away perspective view of a direct insolation monitor designed in accordance with the present invention and also comprising part of the overall assembly of FIG. 1;

FIG. 12 is an end plan view of the monitor of FIG. 11;

FIG. 13 diagrammatically illustrates one aspect of the operation of the monitor of FIG. 11;

FIG. 14 is still another perspective view of the direct insolation monitor of FIG. 11;

FIG. 15 is a block diagram illustrating in more detail the way in which the assembly of FIG. 1 operates;

FIGS. 16 and 17 are schematic diagrams of the electrical circuitry of the direct insolation monitor of FIG. 14;

FIGS. 18A and B are two sections of a detailed schematic diagram of the control electronics comprising part of the overall assembly of FIG. 1.

Turning now to the drawings, wherein like components are designated by like reference numerals throughout the various figures, attention is first directed to FIG. 1. This figure illustrates a tracking type of solar energy collector assembly which is designed in accordance with the present invention which is generally indicated by the reference numeral 10. The overall assembly includes at least one but prefereably a number of light reflecting solar collector panels 12 having identical parabolic cross sections each of which defines a parabolic axis and a focal line. These panels are mounted in an end-to-end relationship with one another by a suitable mounting arrangement 14 for pivotal movement about a common axis 16 through their respective cross sectional focal line. As seen in FIG. 1, arrangement 14 includes a frame 18 which supports pivot mechanism 20 connected at each of the adjacent ends of the two adjacent panels and gear boxes 22. Some sort of pivot mechanisms would, of course, be provided at the other ends. The gear boxes are driven by a reversible electric motor 24 for driving the pivot mechanisms and therefore the panels in either a clockwise (CW) or counterclockwise (CCW) direction effectively about axis 16. An absorber tube 26 is positioned along the axis 16 so as to be located at the cross sectional focal line of the reflecting panels. While not shown, the absorber tube is provided for carrying fluid, e.g., water, across the panels so as to absorb heat and is interconnected with other tubing to carry the heated fluid through a transfer station, e.g., heat exchanger, and thereafter back across the panels again.

The various components of assembly 10 thus far described are known in the art and, hence, do not require a more detailed description. It should suffice to say that the drive motor 24 and its associated panel support components are provided to effectively pivot the panels about axis 16 in order to maintain the panels in a predetermined position or orientation with respect to the sun as the latter moves across the sky from an initial position immediately following sunrise to a final position immediately preceding sunset. The specific position or orientation to be maintained is one where the parabolic principal axis plane is parallel to the incoming solar rays. In this way, the sun's rays are concentrated by the parabolic nature of the reflector panels at their cross sectional focal line and, thence, on to the absorber tube. In this regard, it is worthy to note at this time that there may be a desire to track the sun out of alignment, that is, such that the panel axes are pointed slightly away from the sun, for example, 5 degrees. This procedure is known as desteering.

In addition to the components thus far described, overall assembly 10 includes a solar tracking sensor 28 supported by arrangement 14 for pivotal movement with the panels 12 and a Direct Insolation Monitor or D.I.M. 30 which is supported in a fixed position and at a predetermined orientation with the ambient surroundings by suitable means such as post 31 (see FIG. 14). As will be described in more detail hereinafter, sensor 28 responds to the position of the sun as the latter moves across the sky for producing an output indicating whether or not the panels are in the desired orientation with the sun. The D.I.M. is provided for indicating the presence or absence of direct sunlight or insolation anywhere in the sky and provides appropriate outputs indicative of either of these conditions. The information from each of these components, that is, the outputs from the solar tracking sensor and the D.I.M. are used to control drive motor 24 for continuously placing the solar panels in proper orientation with the sun, that is when the overall assembly is operated in an automatic searching and tracking mode. The specific way in which this automatic mode of operation is accomplished and other ways in which the motor 24 is controlled to provide different features of assembly 14 will be discussed hereinafter.

Referring briefly, to FIGS. 2A, 2B and 2C, attention is directed to the actual way in which the panels 12 are pivoted from one extreme stowed position to an opposite stowed position during its tracking of the sun. In FIG. 2A, the reflector is shown in its stowed position in the east such that the panel axes extend 70° below the Eastern horizon. In FIG. 2B, the panels are shown as they move up from the east to a point 15° above the eastern horizon. Finally, these panels are shown in their western stowed position, 20° below the western horizon. While the panels actually pivot 270° between extreme positions, tracking only takes place from the time the panels reach the FIG. 2B position, that is, 15° above the eastern horizon until they reach a point 15° above the western horizon, a total of 150°. As will be seen hereinafter, tracking sensor 28 only operates within this 150° range which may be referred to as the effective tracking band.

As mentioned briefly above, overall assembly 10 operates not only in the automatic mode described but also includes other features. These other features will be discussed with respect to FIG. 3 along with a further discussion of the way in which the assembly operates in its automatic searching and tracking mode. In FIG. 3, assembly 10 is shown in block diagram form including a master control which is generally designated by the reference numeral 32 in conjunction with reversible drive motor 24, sensor 28 and D.I.M. 30. Note that the outputs from the sensor and D.I.M. are applied to inputs in the master control along with four additional inputs, from specifically CW, CCW, HOLD and DESTEER. The output of the master control is connected to drive motor 24 for driving the latter in either a clockwise or counterclockwise direction.

When assembly 10 is in its automatic searching and tracking mode, only the sensor and D.I.M. inputs are effective and the other inputs remain OFF. The function of the sensor is to place the solar collecting panels in proper orientation with the sun, e.g., to "search" for the sun and thereafter maintain the panels in this position. The function of the D.I.M. is to allow the sensor to perform its searching and tracking functions only when there is direct sunlight (insolation) available. If the sun is behind a cloud or is not out at all, for example, prior to sunrise and after sunset, the motor 24 is retained in a de-energized state stopping all movement of the panels and sensor. Therefore, as the sun moves across the sky, so long as it is directly visible, the sensor 28 will be allowed to track it and cause the panels to pivot to maintain the proper orientation. However, any time sunlight disappears as is monitored by D.I.M. 30, motor 24 will be de-energized and remain so until direct sunlight appears again. At that time, sensor 28 will be allowed to function and, since the sensor and panels would no longer be in alignment with the sun, the sensor will go into a search mode until the panels were again properly oriented.

The foregoing description of the automatic searching and tracking mode includes still another feature which was only touched upon above. As stated then, the tracking band or zone is only 150°, that is, from 15° above the eastern horizon to 15° above the western horizon. As will be seen hereinafter, sensor 28 includes switch means, specifically two mercury switches, which operate to "blind" the sensor, that is, override its output when the sensor and panels are outside the tracking zone so that the D.I.M. 30 controls the operation of the drive motor 24 maintaining the latter energized and does so until the panels enter this band regardless of the orientation of the panels and sensor with the sun. This prevents the sensor from inadvertently tracking a shiny object on the ground. Of course, when there is no direct sunlight in the sky, the D.I.M. will not allow the drive motor to operate whether or not the panels and sensor are in or out of the tracking band. In this regard, as will be discussed hereinafter, the D.I.M. itself is provided with its own blinders so that the overall assembly acts as if there is no direct sunlight available during an initial period after the sun first comes up over the horizon, e.g., for about 20° of vertical movement and just as it goes down below the western horizon, e.g. for the last 20° of vertical movement.

The remaining inputs to the master control 32 operate the overall assembly in an OVERRIDE MODE, and as will be seen hereinafter, include ON/OFF switches for initiating these modes. When the CW mode is initiated, drive motor 24 is driven in its clockwise direction regardless of the position of the sun or the position of the panels, unless, of course, the panel is already in its extreme clockwise position. When the CCW mode is initiated, the drive motor is driven in its counterclockwise direction, with the same limitation that was just mentioned. When the HOLD mode is initiated the drive motor is de-energized or maintained in a deenergized state so as to maintain the solar panels in a stationary position. In this regard, if the panels themselves are in direct alignment with the sun at the onset of or during operation of the HOLD mode the master control in conjunction with sensor 28 causes the drive motor 24 to energize relocating the panels in their DESTEER POSITION, e.g., 5° out of alignment with the sun and then de-energizes the motor. When the DESTEER MODE is initiated, the assembly operates in the exact same manner as the automatic searching and tracking mode except that the panels are maintained out of alignment with the sun in a fixed amount, for example, 5° out of alignment.

As stated above, each of the override modes just described is initiated by means of an ON/OFF switch. Therefore, it is possible to inadvertently initiate more than one of these modes at a time. However, master control 32 includes circuitry which places priority on each of the override modes. First priority is given to the CW mode which means that this mode will prevail whether or not the other override modes or even the automatic mode has been initiated. Second priority is given to the CCW mode, third priority is given to the HOLD mode and fourth priority is given to the DESTEER MODE. Therefore, last priority is given to the automatic searching and tracking mode with its associated D.I.M. 30 control logic. With respect to this latter mode, once any of the override modes are initiated and thereafter deactivated, placing the assembly in its automatic mode, the sensor 28 automatically goes into a searching mode to look for the sun, of course, assuming that there is sufficient direct sunlight in the sky as indicated by the D.I.M. 30. If direct sunlight is not available, the overall assembly will remain stationary. If direct sunlight is available but the sensor is outside the tracking zone, motor 24 will energize and remain energized moving the sensor and panels into the tracking band at which time the sensor will go out of the searching mode and into its tracking mode.

Turning now to FIGS. 4 to 9, attention is directed to the detailed construction of sensor 28. As will be seen hereinafter, this sensor is of the shadow band type which is known in the art. However, as will also be seen, sensor 28 includes a number of specific features which increase overall reliability of operation. With specific reference to FIGS. 4 to 7, the sensor is shown including a housing 34 including a base 36 defining an inner support surface 38 and opposite sidewalls 40 which together define an interior chamber 42. The sensor also includes a multi-element shadow detecting arrangement in the form of four photodetectors PD1, PD2, PD3 and PD4 spaced predetermined distances from one another on a substrate 48, as best seen diagrammatically in FIG. 8. For reasons to become apparent hereinafter, the photodetectors PD1 and PD2 should be identical with one another and the photodetectors PD3 and PD4 should be identical with one another. Therefore, in accordance with the present invention, the four detectors are formed on and comprise part of a common silicon wafer which serves as substrate 48 in a preferred embodiment. In an actual working embodiment, the silicon wafer 48 is manufactured by Optical Coating Laboratories, Inc. (Model No. 905-15168) and actually includes 33 equally spaced apart, identical photodiodes (1 to 33). However, for the present application, only the diodes indicated PD1, PD2, PD3 and PD4 are used.

As best seen in FIGS. 5 and 7, wafer 48 is positioned on the planar surface 38 of base 36 in approximately the center of chamber 42 and extends in a direction normal to the sidewalls 40. In this way, the number 1 photodiode on the wafer as seen in FIG. 8 is closest to the right-hand sidewall 40 as viewed in FIG. 6 and the photodiode 33 in FIG. 8 is closest to the left-hand sidewall as viewed in FIG. 6.

Housing 34 also includes a shadow band 49 extending above base 36 and the photodetectors are supported in this position by a central wall 50 which is equidistant from sidewalls 40 as best seen in FIG. 6. As also seen in this figure, the shadow band itself is off-set so as to extend a further distance to the right of the center wall and then the left of the center wall, as viewed in this figure. At the same time, the center wall separates the silicon wafer in half so that the photodiodes 1 to 16 are on one side and photodiodes 18 to 33 are on the other side. The exact positional relationship between the shadow band, central wall and the four active photodiodes, that is photodiodes PD1, PD2, PD3 and PD4, is quite important and will be discussed hereinafter with respect to FIG. 8. In any event, it should be noted that the two sidewalls 40 and the shadow band central wall 50 together provide a pair of slots 52 and 54 for passage of ambient sunlight into chamber 42. A protective glass window 56 may be provided across the slots and the top of the shadow band as seen in FIG. 6 to close chamber 42 to the ambient surroundings.

In addition to the foregoing, sensor 28 includes electrical leads generally indicated at 58 which are connected between four photodiodes inside housing 34 and an output terminal 60 for connection into master control 32 as will become apparent with respect to FIG. 18 to be discussed hereinafter.

Finally, sensor 28 includes 2 mercury switches 41A and 41B which are mounted into the base 36 of the sensor housing best seen in FIG. 6. For the reasons to be described below, these switches are oriented at transverse angles with one another and with the sidewalls 40. These switches also include lead wires to the output terminal 60.

Referring now to FIG. 8, attention is directed to the way in which the sensor operates to indicate whether or not it is in direct alignment or DESTEERED alignment with the sun and therefore whether the solar panels are in proper orientation. This technique is well known in the art and hence will not be described in detail. It is, however, important to note that in the present sensor, the photodiodes PD1 and PD2 are used to determine whether the sensor and panels are in direct alignment with the sun and the photodiodes PD3 and PD4 are used to monitor the DESTEER position. Assuming first that it is desirable to maintain the panels in direct alignment with the sun, that is, so that the axes of the panels and the separating wall 50 of the sensor are pointed towards the sun, the outputs from the PD1 and PD2 photodiodes are interconnected into the master control 32. If the sensor and panels are not in direct alignment with the sun, either the photodiode PD1 or the photodiode PD2 will be illuminated while the other will be shadowed, depending upon which side of the central wall the sun is located. In either case, the transduced electrical outputs from these photodiodes will be different, ultimately causing the master control to energize the drive motor either clockwise or counterclockwise until the sensor and panels are placed in direct alignment with the sun. This is, of course, assuming that the various other conditions discussed previously allow the drive motor to be energized in this manner. For example, it must be assumed that the assembly is in its automatic mode and not in an override mode, that the D.I.M. senses the presence of direct sunlight and that the sensor is in the tracking zone. When the sensor and panels are in direct alignment with the sun, it should be apparent from FIG. 8 that the two photodiodes PD1 and PD2 will be equally shadowed by the shadow band, thereby producing equal transduced electrical outputs. These equivalent outputs are also applied to the master control which, in response thereto, de-energizes the drive motor.

In order to operate the assembly in the DESTEER mode, the operation just described is applicable except that the photodiodes PD1 and PD2 are deactivated and the photodiodes PD3 and PD4 are activated, that is, connected into the master control. So long as these latter diodes are uniformly shaded, the sensor outputs are balanced indicating that the sensor and the panels are in their proper positions, e.g., the DESTEERED position. Should one or the other of the photodiodes PD3 and PD4 receive more illumination than the other, the unbalanced outputs will cause the master control to energize the drive motor in the appropriate direction (assuming again that all the other conditions are met) until the photodiodes are again balanced.

From the foregoing, it should be apparent why it is important to insure the utilization of identical photodetectors PD1 and PD2 and identical photodetectors PD3 and PD4 whether these photodetectors are photodiodes or some other such device. By forming these photodetectors on and as part of a common silicon wafer and by making them the same size, it is possible to insure that they are indeed identical. Moreover, by utilizing a common wafer, the photodetectors can be more reliably spaced from one another the desired distances. It should also be apparent from the foregoing that the two slots 52 and 54 into the housing of the sensor 28 provide a limited field of view from the ambient surroundings into the photodetectors. This minimizes the amount of accumulated stray light entering the housing and adversely affecting the operation of the sensor by illuminating the photodetectors with light which should not be present.

Whether or not the sensor 28 operates in its automatic or DESTEERED mode, the two mercury switches 41A and 41B prevent its outputs from having any effect at all on the master control 32 when the sensor is located outside the previously described tracking zone. This is best exemplified in FIG. 9 which illustrates the position of each mercury switch on the sensor and therefore the panels as the latter rotate from the eastern stowed position to the western stowed position. As seen in this figure, when the sensors and panels are stowed in the east, that is, 70° below the eastern horizon, both mercury switches are closed (in a conductive state) and at least one remains in this state until they both reach the eastern edge of the tracking zone, that is, 15° above the eastern horizon. Both of the mercury switches remain non-conductive until the sensor reaches the western edge of the tracking zone, that is, 15° above the western horizon at which time one of the switches closes. They are both closed (conductive) when the sensor and panels reach their western stowed position. As can be seen in the schematic diagram in FIG. 18, so long as either of these switches is in its closed, conductive states, the inputs of the sensor to the master control become ineffective so that the sensor is effectively "blind" to its surroundings and plays no role in the control of the assembly, as described previously.

Having described sensor 28 from both a structural and operational standpoint, attention is now directed to FIG. 10 which illustrates a slightly modified sensor 28'. This latter sensor is identical in function to sensor 28 and includes many of the same components. For example, sensor 28' may include an indentical base 36 which supports an identical wafer 48 containing photodiodes PD1, PD2, PD3 and PD4 and associated lead wires to output terminals 60. In addition, the modified assembly may include identical sidewalls 40 and mercury switches 41A and 41B. However, the embodiment in FIG. 10 does not include the central wall nor does it include the shadow band of the type described previously. Rather, at the top of sidewalls 40 are two shadow shoulders 62 and 64 which confront one another and which are positioned over the photodiodes so as to just shadow photodiodes PD1 and PD2 when the sensor is in direct alignment with the sun and to just shadow the photodiodes PD3 and PD4 when the sensor is in its DESTEERED position. A glass window 66 extends across the opening between shadow shoulder 62 and 64 in order to seal the interior of the sensor.

Turning now to FIGS. 11 to 14, attention is directed to the structural and operational details of direct insolation monitor 30. As stated previously, the function of this monitor is to indicate whether or not there is direct sunlight anywhere in the section of the sky being monitored. Moreover, this is accomplished without moving the monitor but rather maintaining it at a fixed orientation with the ambient surroundings. This is to be contrasted with a pyrheliometer which is used to measure the intensity of direct sunlight while tracking the latter. The D.I.M. does, however, respond to limited or narrow beams of sunlight and in this respect must be contrasted with a pyronometer which measures accumulated sunlight. The drawbacks with a pyronometer have been discussed previously.

Turning specifically to FIG. 11, D.I.M. 30 is shown including an overall outside housing 70 including a base 72 containing some of the electrical circuitry of the D.I.M. to be described hereinafter with respect to FIGS. 16 and 17. The housing also includes a pair of spaced apart sidewalls 74 extending on opposite sides of and up from base 72. A rim 78 extends inward along the top edge portion of the sidewall 74 and continues around the top of the base to and along the top edge of sidewall 74 and finally back to the sidewall 74 along the base so as to define a semicircular opening or slot 80 which allows the passage of light into the housing. A glass window 82 may be provided around the slot in order to seal the inner chamber of housing 70 from the ambient surroundings.

As seen only in FIG. 11, D.I.M. 30 contains within housing 70 a circuit board 84 comprised of a substrate and a number of electronic components, the latter to be discussed hereinafter with respect to FIGS. 16 and 17. The substrate itself is utilized to support four direct sunlight or insolation arrangements 86 equally spaced angularly from one another along slot 80 for determining whether or not direct sunlight is present within its field of view.

Referring specifically to FIG. 13, attention is directed to one of the arrangements 86 which is shown somewhat diagrammatically. As seen there, the arrangement includes a light opaque housing 88 including sidewalls 90, a base 92 and a top 94, all of which define an interior chamber 98. The only entry into this chamber for sunlight is a slot 100 which extends transverse to the direction of slot 80 in overall housing 70. Located within this chamber are eleven equally spaced photodetectors PD5, PD6 and so on up to PD15. These photodectors which are preferably identical are supported on a substrate 104 which itself is maintained on the inner top surface of base 92. In a preferred embodiment, the substrate 104 and its photodetectors are identical to the previously described photodetectors PD1 to PD4 (and the non-active ones) formed on and as part of the silicon wafe 104 comprising part of sensor 28. As seen in FIG. 13, the output leads from each of these photodetectors extends out through the base of housing 88 where they are interconnected into the D.I.M. circuitry to be described hereinafter.

Each of the housings 86 operates to allow a limited and relatively narrow beam of light into its chamber as illustrated diagrammatically on FIG. 13. Each specific housing is positioned to monitor one-quarter of the total zone of the sky being monitored (as will be discussed hereinafter) and the positional relationship between slit 100 and the eleven photodetectors in the specific housing is such that a narrow beam of direct sunlight will always impinge on at least one of these photodetectors as the sun moves through the quadrant of the sky being monitored. In other words, with all four arrangements 86 positioned to divide the sky into four quadrants, if there is any direct sun at all in the sky, a narrow beam of sunlight will impinge upon at least one of the photodetectors in one of the housings. This in turn means at least one of the photodetectors e.g., the one receiving the direct beam of sunlight, will provide greater transduced electrical output than the other photodetectors, e.g., the ones that do not receive a beam of direct sunlight. Moreover, because only a limited beam of sunlight is allowed into each housing, the possibility of impinging on one or more of the photodetectors with accumulated diffused light of equal intensity as direct sunlight, for example, accumulated light from a relatively large cloud, is quite remote. This is one reason why D.I.M. 30 is more reliable than a pyronometer in distinguishing direct sunlight from accumulated diffused sunlight.

Because the purpose of D.I.M. 30 is to determine whether or not direct sunlight is present as the sun moves across the sky, it is important to properly orient the D.I.M. with respect to the section of the sky across which the sun moves. This position will, of course, depend upon where on the earth's surface the D.I.M. is to be located. The general orientation is shown in FIG. 12 and the angle will preferably remain fixed once set or at least it is designed to have this capability. As an example, if the D.I.M. were installed in Nashville, Tennessee the angle $\theta$ would be approximately 36°. In this way, at that location the D.I.M. will monitor a section of the sky including the sun from sunrise to sunset and during all seasons of the year, that is, when the sun is high in the sky during summer and when the sun is low in the sky during winter. However, referring specifically to FIG. 14, the D.I.M. is shown on top of the previously mentioned support pole by means of a bracket 110. As shown there, the bracket includes a pair of plates 112 which serve as blinders on either side of the D.I.M. These blinders prevent the D.I.M. from seeing direct sunlight for a short period after sunrise, e.g., for about 20° of solar movement vertically, and for a short period of time prior to sunset, e.g., for about 20° of movement vertically just preceding sunset. In this way, the drive motor 24 will be maintained de-energized during these periods, assuming, of course, the assembly is being operated in its automatic or DESTEERING modes.

Having described D.I.M. 30 both structurally and functionally, attention is now directed to FIG. 15 for a more detailed discussion of the overall operation of assembly 10. The assembly is shown there including motor 24, sensor 28, D.I.M. 30, the four override modes CW, CCW, HOLD and DESTEER and the master control 32. In addition, this figure illustrates the previously described mercury switches 41A and 41B, two relays, a CW relay and a CCW relay and associated relay contacts which operate from the output of the master control. The master control also indicates its priority setting capabilities.

With the overall assembly operating in its automatic searching and tracking mode, the sensor 28 is shown including two outputs which corresponds to the two active photodetector elements in the sensor, either PD1 and PD2 or PD3 and PD4. A single output which actually indicates whether or not one or more of its 44 photodetectors are being impinged by direct sunlight. If D.I.M. 30 indicates that there is sufficient direct sunlight, if the outputs from sensor 28 are out of balance, and if both of the switches 41A and 41B are opened (which means the sensor and panels are within the previously described 150° tracking zone), then the master control 32 will energize either the CW relay or the CCW relay depending upon the imbalance between the two sensor outputs. The energized relay will cause its associated contact within the power line to drive motor 24 in the appropriate clockwise or counterclockwise direction. This movement will continue until the two outputs of sensor 28 are balanced causing the energized relay to de-energize, opening its associated contact and de-energizing the drive motor. The override modes operate in the manner described previously to either energize or de-energize the appropriate relay for either energizing or de-energizing motor 24. It is not important whether or not the relays are electro-mechanical or solid state.

Referring now to FIGS. 16 and 17, attention is directed to the electrical circuitry making up D.I.M. 30. As seen in FIG. 16, each of the 11 photodetectors PD5, PD6 and so on up to PD15 comprising part of one of the four arrangements 86 are shown. However, only one group is shown since the others would be identical. Note that each photodiode has a 10 K ohm shunt resistor connected across it to convert the current output from the photodiode to a corresponding voltage output. Each voltage output is applied to one side of a comparator. The reference side of the comparator is provided from the output of the circuitry shown in FIG. 17 (terminal B) to be described hereinafter. Operationally, if the intensity of sunlight on any given photodiode is less than the threshold level as determined by the reference voltage, the comparator output (Terminal A) is high and if the light intensity goes above the threshold, the comparator goes low. This high or low signal is applied to the circuitry in FIG. 17 as will be described. The C and D input terminals shown in FIG. 16 are for providing 12 VDC power to the comparators.

Turning to FIG. 17, attention is first directed to the circuitry providing the reference voltage for each of the comparators in FIG. 16. As seen in FIG. 17, the circuitry receives 110 volts AC or other available power at terminal TS1 (terminal points 1 and 2). The transformer T1 transforms this incoming power to 24VAC which is rectified by means of full wave rectifier bridge CR2. The rectified signal passes through a current limiting resistor R3 and is filtered by the capacitor C2. It is then regulated to +12 volts and filtered for driving the self-heated voltage reference circuit Z1. The indicator light (light emitting diode) CR1 and associated resistor R4 are provided in the circuit. A potentiometer R1 in conjunction with unity gain buffer IC2 and with filter capacitor C4 provide an adjustable reference signal at the terminal B which is applied to the comparators illustrated in FIG. 16.

As stated previously, the outputs from the comparators in FIG. 16 are applied to the input of the circuitry in FIG. 17 (Terminal A). More specifically, either a high signal representing the lack of direct sunlight or a low signal representing the presence of direct sunlight is applied through the unity gain buffer IC2 in FIG. 17 to the input of an inverter IC1. The combination capacitor C2 and resistor R5 serve as an RC time delay filter. The high or low signal is inverted and then applied to the input of a solid state relay through a current limiting resistor R6. If the signal entering the solid state relay is low (previously high) the solid state relay is turned on and its contact is closed. If the signal is high (previously low) the relay is off and its contact is open. This relay contact is connected across the terminals 5 and 6 in the terminal strip TS1 which are connected into the circuitry shown in FIG. 18.

The circuitry in FIG. 18 represents the master control for operating the assembly in the manner described and also includes the various ON/OFF switches for the overriding modes as well as the four photodiodes PD1, PD2, PD3 and PD4 comprising part of sensor 28. In addition, contacts representing the two mercury switches 41A and 41B are shown and the CW and CCW relays and their associated contacts. Finally, the inputs to two limit switches which were not previously discussed are shown in this FIG. 18. A limit switch is physically provided at the extreme clockwise position of movement of the sensor and panels and one is positioned at the extreme counterclockwise position to de-energize the motor when the sensor and panels reach either of these positions.

Finally, in order to more fully appreciate the operation of the circuitry illustrated in FIGS. 16, 17 and 18 the following tables indicate the actual working components utilized unless already indicated in the figures or readily provided by those with skill in the art. Table I lists the components making up the circuitry in FIGS. 16 and 17 and Table II lists the components making up the circuitry in FIG. 18. However, it is to be understood that the present invention is not limited to these components.

TABLE I

| Ref. Desig. | Description | Part No. (Source) |
|---|---|---|
| IC2 | Quad Operational Amplifier | National LM 2902 N |
| IC1 | Hex Inverting Buffer | National CD 4049 CN |
| Z1 | +7.0V Voltage Reference | National LM 399 H |
| Z2 | +12 VDC Voltage Regulator | National LM 342P-12 |
| T1 | Transformer | Triad F-133P |
| R1 | 10K Potentiometer | Beckman 58 PR 10K |
| SSR | Solid State Relay | Crydom S3022 |
| FIG. 16 | Quad Comparator | National LM 2901 N |

TABLE II

| Ref. Deisg. | Description | Part No. (Source) |
|---|---|---|
| 2A | Decade Counter | National CD4017 BCN |

TABLE II-continued

| Ref. Desig. | Description | Part No. (Source) |
|---|---|---|
| 3A | Hex Inverting Buffer | National CD4049 CN |
| 4A, 6A, 5B | Quad Nor Gate | National CD4001 CN |
| 5A, 2B | Quad Bilateral Switch | National CD4066 BCN |
| 7A | Quad Nand Gate | National CD4011 CN |
| 1B, 3B | Quad Operational Amplifier | National LM2902 N |
| 7B, 7B1, 8B, 8B1, 9B, 9B1, 10B1 | Optoisolator | Gen. Electric H11AA1 |
| Z1 | +12 VDC Voltage Regulator | National LM342P-12 |
| T1 | Transformer | Triad F-133P |
| R1 | 10K Potentiometer | Beckman 58PR10K |
| CR1-6, 8-20, 22 | Silicon Signal Diode | Autodata P/N 90201-001 |
| CR7 | Light Emitting Diode (Red Diffused) | Autodata P/N 90204-019 |
| CR21 | Full Wave Bridge Rectifier | Autodata P/N 90205-003 |

What is claimed:

1. A tracking type of solar energy collector assembly comprising:
   means including a panel member for collecting solar energy, said panel member being mounted for movement along a tracking path in order to maintain a predetermined orientation with the sun as the latter moves across the sky from an initial position immediately following sunrise to a final position immediately preceding sunset;
   means for moving said panel member along said tracking path;
   solar position sensing means mounted for movement with said panel member and responsive to the position of the sun for producing an output indicating whether or not said panel member is in said predetermined orientation with the sun;
   direct insolation monitoring means including a plurality of fixed light sensing elements positioned in a fixed orientation with the ambient surroundings to receive a limited beam of direct sunlight on at least one of said light sensing elements regardless of the position of the sun as the latter moves from its initial position in the sky to its final position, said monitoring means producing outputs respectively corresponding to the intensity of light received at said light sensing elements; and
   control means connected with said moving means and responsive to the outputs from said solar position sensing means and said monitoring means when operating in an automatic searching and tracking mode for controlling the operation of said moving means to continuously place said panel member in said predetermined orientation with the sun as the latter moves across the sky from its initial position to its final position and so long as the intensity of light received on at least one of said sensing elements is at or above the threshold level indicative of the presence of direct sunlight.

2. An assembly according to claim 1 wherein said panel member is mounted for movement along said path from an initial position oriented in the general direction of and below the eastern horizon to a final position oriented in the general direction of and below the western horizon and wherein said control means includes bypass means for causing said moving means to move said panel member along said tracking path from a position below a predetermined point above either of said horizons to said point without regard to the output of said position sensing means but so long as at least one of said light sensing elements receives sunlight of an intensity above said theshold level whereby to by-pass the operation of said position sensing means until said panel member is at or above either of said predetermined points.

3. An assembly according to claim 2 wherein said by-pass means includes first and second mercury switches fixedly mounted on and for movement with said position sensing means, said first switch operating between first and second positions depending on whether said panel member is below said first predetermined point and said second switch operating between first and second positions depending on whether said panel member is below said second predetermined point.

4. An assembly according to claim 1 wherein the output of said solar position sensing means indicates that said panel assembly is at said predetermined orientation with the sun when said panel member is positioned in direct solar alignment with the sun, said position sensing means alternatively producing an output indicating that said panel member is at said predetermined orientation when said panel member is positioned a fixed amount out of direct solar alignment with the sun.

5. An assembly according to claim 4 wherein said panel member is parabolic in cross section and has a parabolic axis extending in the direction of the sun when said panel member is in direct alignment with the sun.

6. An assembly according to claim 1 wherein said control means when operating in said automatic searching and tracking mode controls the operation of said moving means to maintain said panel member in a fixed position in response to and so long as the light intensity received on all of said sensing elements is below said threshold level.

7. An assembly according to claim 6 wherein said control means when operating in said automatic mode controls the operation of said moving means to continuously move said panel member back and forth along said tracking path in accordance with a predetermined search pattern until said panel member is of said predetermined orientation with the sun and so long as the light intensity at any one of said light sensing elements is at or above said threshold level.

8. An assembly according to claim 7 wherein said control means includes override means for overriding said automatic operation and controlling the operation of said moving means to control the movement of said panel member in a plurality of alternative predetermined ways independent of the outputs of said position sensing means and direct insolation monitoring means.

9. An assembly according to claim 8 wherein said override means includes a plurality of separate switch means, each of which is movable from an OFF position to an ON position to override said automatic operation and control the movement of said panel member in one of said predetermined ways, said control means including means for setting a priority for such predetermined ways in the event more than one of said switch means is placed in their ON position at one time.

10. An assembly according to claim 8 wherein said control means includes means for automatically operating said moving means to move said panel member in said back and forth searching pattern until said panel is at said predetermined orientation if the assembly is operated in said automatic mode after operating in an overriding mode.

11. An assembly according to claim 1 wherein said solar position sensing means includes:
a pair of substantially identical first and second light sensing elements;
means for supporting said first and second elements in fixed, spaced apart positions relative to one another; and
light shadowing means cooperating with said supporting means and adapted to expose said first and second light sensing elements to the ambient surroundings such that said last-named elements are uniformly shaded from the sun and thereby receive the same sun light intensity only when said panel member is at said predetermined orientation with the sun.

12. An assembly according to claim 11 wherein said light shadowing means includes a housing containing said first and second light sensing elements, said housing including a light opaque shadow band extending over said last-named elements, a light opaque center wall extending up to said shadow band from said supporting means between said elements, and first and second light opaque side walls on opposite sides of and spaced from said center wall and shadow band whereby to provide a pair of light passing slots on opposite sides of said band for entry into said housing.

13. An assembly according to claim 11 wherein said solar position sensing means includes a second point and substantially identical third and fourth light sensing elements supported on said supporting means such that said light shadowing means are adapted to expose said third and fourth elements to the ambient surroundings such that said last-mentioned elements are uniformly shaded from the sun and thereby receiving the same sun light intensity only when said panel member is at a second predetermined orientation with the sun.

14. An assembly according to claim 11 wherein said first and second light sensing elements are photodetectors formed on and as part of a common silicon wafer.

15. An assembly according to claim 11 wherein said shadowing means includes a housing defining a chamber containing said first and second light sensing elements, said housing including a base supporting said first and second elements, first and second sidewalls on opposite sides of said base and shadow providing shoulders supported by and extending toward one another above said last-named elements whereby to provide an opening into said chamber for providing said exposure of said first and second elements.

16. An assembly according to claim 1 wherein said direct insolation monitoring means includes a number of housings, each of which contains a group of said fixed light sensing elements and includes an opening sized to allow only a limited beam of light therein for impingement on the contained elements, said housing being positioned relative to one another and to the ambient surroundings to receive said limited beam of direct sunlight on at least one of said elements contained in at least one of said housings regardless of the position of the sun.

17. A tracking type of solar energy collector assembly, comprising:
a solar collecting panel arrangement including at least one panel and means mounting said panel for movement between a first stowed position such that the panel is pointed below the eastern horizon and a second stowed position such that the panel is pointed below the western horizon;
means for rotating said panel between said extreme positions;
a solar tracking sensor mounted for movement with said panel and responsive to the position of the sun as the latter moves across the sky from an initial position immediately following sunrise to a final position immediately preceding sunset for producing an output indicating whether or not the panel is in direct alignment with the sun, said device including first and second identical photodetectors formed on a common silicon wafer spaced a predetermined distance from one another and a housing having an inner chamber containing said wafer and photodiodes in a fixed position therein, said housing including shadow means extending over and above said photodiodes, sidewalls on opposite sides of and spaced from said wafer, and at least one opening into said housing chamber, said opening being adapted to expose said photodiodes to the ambient surroundings such that the latter are uniformly shaded from the sun by said shadow means and thereby receive the same sunlight intensity only when the panel is in direct alignment with the sun;
a direct insolation monitor adapted for positioning at a fixed, predetermined orientation, said monitor including a plurality of housings, each of which contains a group of spaced apart photodetectors formed on a common silicon wafer and a slotted opening sized to allow only a limited beam of light therein for impingement on the contained photodetectors, said housing being positioned relative to one another and the ambient surroundings so that a limited beam of direct sunlight will impinge on at least one photodetector in at least one of said housings regardless of the position of the sun as the latter moves from its initial position in the sky to its final position, said monitor producing a plurality of outputs respectively corresponding to the intensity of light impinging on said detectors;
control means connected with said moving means and responsive to the outputs in said sensor and said monitor when operating in an automatic search and tracking mode for controlling the position of said moving means to continuously place the panel in direct alignment with the sun as the latter moves across the sky from its initial position to its final position and so long as the intensity of light received on at least one of said monitor photodetectors is at or above the threshold level indicative of the presence of direct sunlight.

18. A solar tracking sensor for use in a solar energy collector assembly of the tracking type including a panel member which is mounted for movement along a predetermined tracking path in order to maintain a predetermined orientation with the sun at the latter moves across the sky, said sensor being adapted for movement with said panel member and comprising means responsive to the position of the sun for producing an output indicating whether or not said panel member is in said predetermined orientation with the sun, said output producing means including first and second identical photodetectors formed on and from a common silicon wafer and spaced apart a predetermined distance from one another and a housing defining an inner chamber for containing said wafer and photodetectors in fixed positions therein, said housing including a base for supporting said wafer and photodetectors, shadow means extending over and above said photodetectors, sidewalls on opposite sides of and spaced from said wafer and at least one opening adjacent said shadow means, said opening exposing said photodetectors to the ambient surroundings such that the latter are uniformly shaded from the sun and thereby receive the same sunlight intensity only when said panel member is at said predetermined orientation with respect to the sun.

19. A sensor according to claim 18 wherein said shadow means includes an elongated shadow band extending over and above said photodetectors and wherein said housing includes a center wall extending up to said shadow band from said wafer between said photodetectors for separating said opening into two slotted openings on opposite sides of said shadow band and center wall.

20. A sensor according to claim 18 wherein said shadow means includes a pair of shoulders extending toward one another from and connected with said sidewalls on opposite sides of said opening.

21. A direct insolation monitor for use in a solar energy collector of the tracking type including a panel mounted for movement along a predetermined tracking path in order to maintain a predetermined orientation with respect to the sun as the latter moves across the sky from a first position immediately following sunrise to a second position just preceding sunset, said direct insolation monitor being adapted for mounting at a fixed orientation with the ambient surroundings and comprising means including a plurality of fixed light sensing elements positioned relative to one another and to the ambient surroundings to receive a limited beam of direct sunlight on at least one of said light sensing elements regardless of the position of the sun as the latter moves from said first position in the sky to said second position, said means producing outputs respectively corresponding to the intensity of light received at said light sensing elements whereby said outputs are capable of distinguishing between the presence and absence of direct sunlight regardless of the position of the sun.

22. A direct insolation monitor according to claim 19 wherein said last-named means includes a number of housings, each of which contains a group of said fixed light sensing elements and also includes an opening sized to allow a limited beam of light therein for impingement on the contained elements, said housings being positioned relative to one another and to the ambient surroundings to receive said limited beams of direct sunlight on at least one of said elements contained in at least one of said housings regardless of the position of the sun.

* * * * *